United States Patent
Ijima

(10) Patent No.: US 10,723,320 B2
(45) Date of Patent: Jul. 28, 2020

(54) WIPER CONTROL DEVICE

(71) Applicant: DENSO CORPORATION, Kariya-shi, Aichi (JP)

(72) Inventor: Hiroto Ijima, Hamamatsu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/072,760

(22) PCT Filed: Jan. 31, 2017

(86) PCT No.: PCT/JP2017/003458
§ 371 (c)(1),
(2) Date: Jul. 25, 2018

(87) PCT Pub. No.: WO2017/135260
PCT Pub. Date: Aug. 10, 2017

(65) Prior Publication Data
US 2019/0061695 A1    Feb. 28, 2019

(30) Foreign Application Priority Data
Feb. 1, 2016 (JP) .................. 2016-017134

(51) Int. Cl.
*B60S 1/08* (2006.01)
(52) U.S. Cl.
CPC ..................... *B60S 1/08* (2013.01)
(58) Field of Classification Search
CPC ...... B60S 1/08; H02P 5/50; H02P 5/56; H02P 7/2885
See application file for complete search history.

(56) References Cited

U.S. PATENT DOCUMENTS 4,544,870 A * 10/1985 Kearns .................... B60S 1/482
15/DIG. 15
4,866,357 A * 9/1989 Miller ....................... B60S 1/08
318/443

(Continued)

FOREIGN PATENT DOCUMENTS

JP    2011-218998 A    11/2011
JP    2015-006809 A    1/2015

(Continued)

OTHER PUBLICATIONS

Mar. 7, 2017 International Search Report issued in International Patent Application PCT/JP2017/003458.

*Primary Examiner* — Thai T Dinh
(74) *Attorney, Agent, or Firm* — Oliff PLC

(57) ABSTRACT

A wiper blade which starts an operation from a reversal position different from a lower reversal position and an upper reversal position with one of the lower reversal position and the upper reversal position as a next movement destination, a wiper control circuit generates a second correction target speed table by correcting the upper/lower reversal position target speed table defining a target rotational speed of an output shaft according to a change in a rotational angle of the output shaft of the wiper motor in a case in which a wiper blade is moved between a lower reversal position and an upper reversal position, based on the different reversal position and the position of the next movement destination of the wiper blade, and controls the rotational speed of the output shaft based on the second correction target speed table.

7 Claims, 11 Drawing Sheets

(56) References Cited

U.S. PATENT DOCUMENTS

| | | | | |
|---|---|---|---|---|
| 6,140,785 | A * | 10/2000 | Hogler | B60S 1/08 |
| | | | | 318/282 |
| 6,150,783 | A * | 11/2000 | Michenfelder | B60S 1/08 |
| | | | | 15/250.13 |
| 8,405,336 | B2 * | 3/2013 | Natsume | B60S 1/245 |
| | | | | 318/444 |
| 9,403,508 | B2 * | 8/2016 | Amagasa | B60S 1/08 |
| 9,469,275 | B2 * | 10/2016 | Braun | B60S 1/08 |
| 10,011,249 | B2 * | 7/2018 | Mayer | B60S 1/245 |
| 2013/0251352 | A1 * | 9/2013 | Natsume | H02P 1/22 |
| | | | | 388/854 |
| 2014/0125255 | A1 * | 5/2014 | Amagasa | H02P 23/20 |
| | | | | 318/3 |

FOREIGN PATENT DOCUMENTS

| | | | |
|---|---|---|---|
| JP | 2015006809 A * | 1/2015 | |
| WO | 2013/005591 A1 | 1/2013 | |
| WO | 2015/002122 A1 | 1/2015 | |

\* cited by examiner

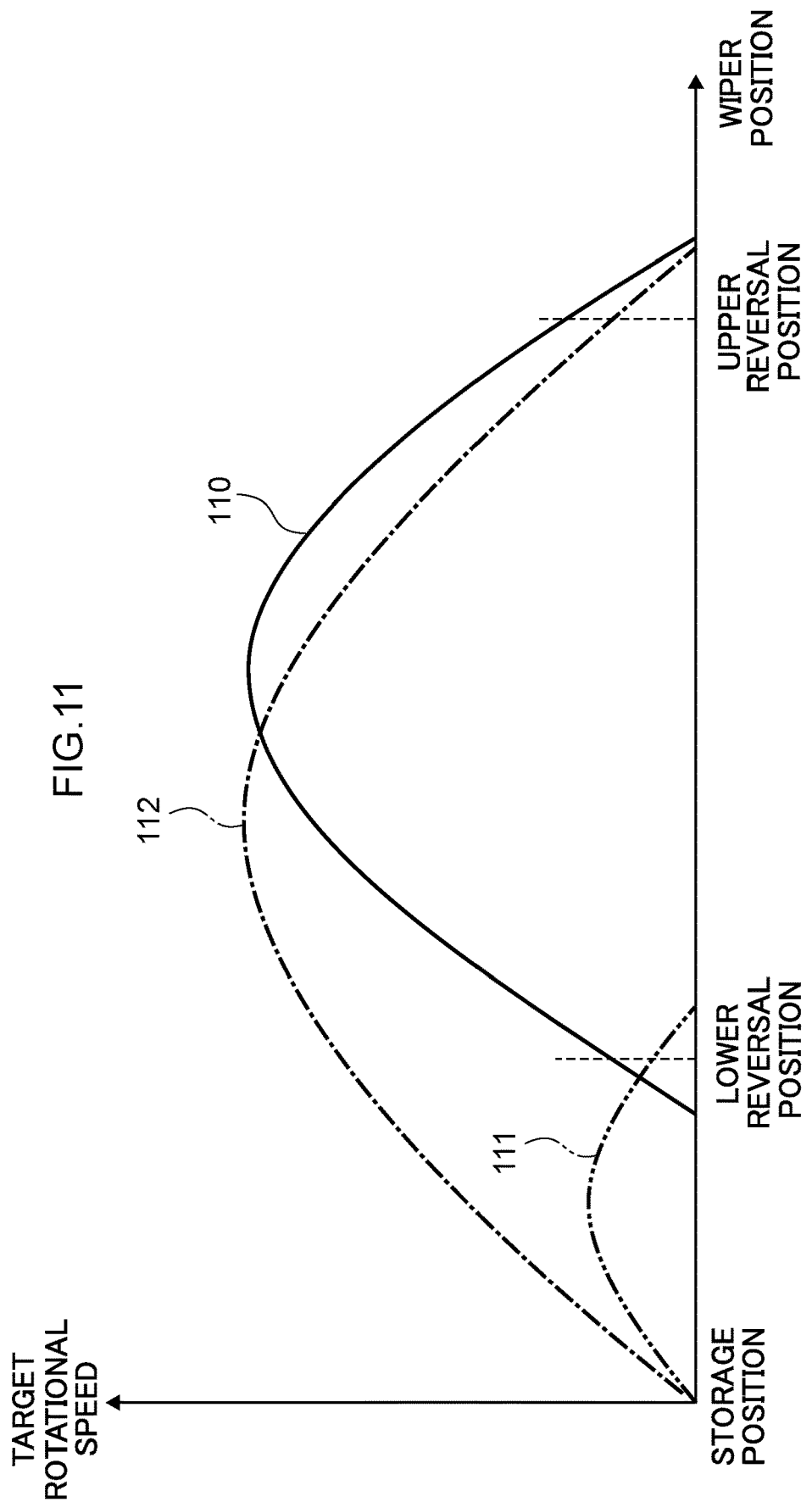

WIPER CONTROL DEVICE

TECHNICAL FIELD

The present invention relates to a wiper control device.

BACKGROUND ART

In a wiper apparatus that wipes a windshield glass surface by reciprocally moving a wiper blade between an upper reversal position and a lower reversal position on a windshield glass, a rotational speed of an output shaft of a wiper motor is controlled according to a target speed table which defines a target rotational speed of the output shaft of the wiper motor according to a position of a wiper blade on a windshield glass.

FIG. 11 shows an example of a target speed table. In FIG. 11, there is described an upper/lower reversal position target speed table 110 that is used when a wiper blade performs a wiping operation between a lower reversal position and an upper reversal position. In addition, in FIG. 11, there is described a storage position/lower reversal position target speed table 111 that is used when moving the wiper blade between the lower reversal position and a storage position at which the wiper blade is stored when the wiper apparatus is stopped. Further, in FIG. 11, there is described a storage position/upper reversal position target speed table 112 that is used when the wiper blade is moved from the storage position to the upper reversal position at the time of starting the wiper apparatus.

As shown in FIG. 11, in a so-called concealed type wiper apparatus that stores a wiper blade below a lower reversal position when stopped, several types of target speed tables are required. In order to store all of these target speed tables, a corresponding capacity is required for the storage device, which may hinder cost reduction of the product.

In addition, as shown in FIG. 11, the target rotational speed is set in anticipation of a case in which the wiper blade overruns at the time of reversal and at the time of stop of each of the target speed tables. For example, the upper/lower reversal position target speed table 110 is set such that the target rotational speed becomes 0 when the wiper blade reaches the storage position below the lower reversal position. In addition, the storage position/lower reversal position target speed table 111 is set such that the target rotational speed becomes 0 when the wiper blade reaches the upper reversal position above the lower reversal position. Further, the upper/lower reversal position target speed table 110 and the storage position/upper reversal position target speed table 112 are respectively set such that the target rotational speed becomes 0 when the wiper blade reaches above the upper reversal position. In addition, due to an error at the time of assembling the wiper apparatus, there are cases in which the actual positions of the upper reversal position and the lower reversal position do not coincide with the upper reversal position and the lower reversal position on the target speed table. In such a case, even if the wiper blade is located at the actual upper reversal position and the actual lower reversal position, the target rotational speed may not become 0 on the target speed table.

As shown in FIG. 11, in a case in which the target rotational speeds at the lower reversal position and the upper reversal position in the target speed table exceeded 0, when the rotation of the wiper motor is controlled according to the target speed table to start the operation from the upper reversal position or the lower reversal position of the wiper blade, there is a possibility that the rotational speed of the wiper motor rapidly increased at the start of operation.

In a case in which the wiper blade is started from a position other than the upper/lower reversal positions or the storage position on the windshield glass, a difference between the target rotational speed at the position at which the wiper blade is stopped and the rotational speed at the stop state (that is, 0) becomes more significant than in a case in which the wiper blade starts an operation from the upper reversal position or the lower reversal position. As a result, there is a fear that the rotational speed of the wiper motor would increase further sharply immediately after startup. When the rotational speed of the wiper motor changes suddenly, not only the behavior of the wiper motor becomes unstable but also the user may feel discomfort in the operation of the wiper apparatus.

International Publication No. 2015/002122 discloses a method of controlling a wiper motor and a motor control device, in which a target speed table is divided into an acceleration zone for accelerating the rotational speed of the wiper motor immediately after starting, a constant speed zone for making the rotational speed of the wiper motor constant after the acceleration zone, and a deceleration zone for decelerating the rotational speed of the wiper motor to 0 after the constant speed zone. In the technique disclosed in International Publication No. 2015/002122, the rotation of the wiper motor is controlled such that the rotational speed of the wiper motor at the start of operation of the wiper blade smoothly rises from 0 by adjusting the length of the constant speed zone of the target speed table according to the position at which the wiper blade starts to operate.

SUMMARY OF INVENTION

Technical Problem

The technique disclosed in International Publication No. 2015/002122 can control the rotation of the wiper motor such that the rotational speed of the wiper motor smoothly rises from 0, for example, even when the wiper blade starts the operation from below the lower reversal position, by extending the constant speed zone. However, according to the technique disclosed in International Publication No. 2015/002122, the maximum value of the rotational speed of the wiper motor is not changed only by lengthening the constant speed zone. As a result, there is a possibility that the user feels uncomfortable if the wiping speed of the wiper blade that wipes a stroke longer than between the lower reversal position and the upper reversal position is slow.

In addition, the technique disclosed in International Publication No. 2015/002122 can control the rotation of the wiper motor such that the rotational speed of the wiper motor smoothly rises from 0, for example, even when the wiper blade starts the operation from above the lower reversal position, by shortening the constant speed zone. However, according to the technique disclosed in International Publication No. 2015/002122, in the case of extremely shortening the constant speed zone, the respective curves of the acceleration zone and the deceleration zone of the target speed table intersect with each other. At the intersection point at which the acceleration zone and the deceleration zone intersect with each other, the curve of the target speed table shows an acute upward convex shape. As a result, at the intersection point, the rotational speed of the wiper motor suddenly changes, which may cause the behavior of the wiper motor to become unstable.

Embodiments of the invention have been made in view of the above fact, and it is an object of the invention to provide a wiper control device that smoothly controls a rotational speed of a wiper motor in a case in which a wiper blade starts operating from an arbitrary position on a windshield glass.

Solution to Problem

In order to solve the above problems, the disclosure includes: a storage unit that stores rotational speed information defining a target rotational speed of a wiper motor in a case in which a wiper blade is moved between one predetermined position and another predetermined position; and a control unit that, in a case in which the wiper blade starts operating from an operation start position that is different from both of the one predetermined position and the other predetermined position, with one of the one predetermined position or the other predetermined position as a next movement destination, controls a rotational speed of the wiper motor by using corrected rotational speed information obtained by correcting the rotational speed information based on the operation start position and a position of the next movement destination of the wiper blade.

According to the wiper control device, the rotational speed information that defines the target rotational speed of the output shaft of the wiper motor when moving the wiper blade between one predetermined position and the other predetermined position is corrected based on the operation start position and the position of the next movement destination of the wiper blade. By using the corrected rotational speed information, the rotational speed of the wiper motor can be smoothly controlled when the wiper blade starts operating from an arbitrary position on a windshield glass.

In addition, the disclosure includes a rotational angle detection unit that detects a rotational angle of an output shaft of the wiper motor, wherein: the target rotational speed of the rotational speed information is determined according to the rotational angle of the output shaft, and the control unit obtains the correction rotational speed information by correcting the target rotational speed using a correction ratio that is a ratio of a rotational angle range between the operation start position and the next movement destination to a rotational angle range between the one predetermined position and the other predetermined position.

According to the wiper control device, the correction ratio, which is the range of the rotational angle of the output shaft from the operation start position to the next movement destination with respect to the range of the rotational angle of the output shaft between one predetermined position and the other predetermined position, is calculated. By correcting the rotational speed information with the calculated correction ratio, the rotational speed of the wiper motor can be smoothly controlled when the wiper blade starts operating from an arbitrary position on the windshield glass.

In addition, in the disclosure, the control unit corrects a rotational angle range of the rotational speed information by multiplying the rotational angle range between the one predetermined position and the other predetermined position of the rotational speed information by the correction ratio, and controls the rotational speed of the wiper motor by applying, between the operation start position and the next movement destination, the corrected rotational speed information, which is obtained by multiplying, by the correction ratio, the target rotational speed of the rotational speed information obtained by correcting the rotational angle range.

According to the wiper control device, by correcting the range of the rotational angle of the output shaft between one predetermined position and the other predetermined position respectively set for the rotational speed information and the target rotational speed of the output shaft, the rotational speed of the wiper motor can be smoothly controlled when the wiper blade starts operating from an arbitrary position on the windshield glass.

In addition, in the disclosure, in a case in which a signal for changing a moving speed of the wiper blade is input, the control unit controls the rotational speed of the wiper motor based on the rotational speed information, which is further corrected by multiplying the target rotational speed of the corrected rotational speed information by a coefficient based on a signal for changing the moving speed.

According to the wiper control device, by correcting the rotational speed information by multiplying the coefficient based on the signal for changing the speed of the wiping operation of the wiper blade, the wiper blade can perform the wiping operation at different wiping speeds by the one piece of rotational speed information. As a result, the capacity of the storage unit for storing the rotational speed information can be reduced, and the manufacturing cost of the product can be suppressed.

In addition, in the disclosure, the target rotational speed of the rotational speed information is discretely determined with respect to a discrete value of the rotational angle of the output shaft of the wiper motor, and the control unit calculates a rotational speed between respective values of the discretely determined target rotational speed of the rotational speed information by linear interpolation.

According to the wiper control device, by calculating the rotational speed between the respective values of the discrete target rotational speed by linear interpolation, the rotational speed of the wiper motor can be smoothly controlled by holding the value of the finite number of target rotational speeds as the rotational speed information. As a result, the capacity of the storage unit for storing the rotational speed information can be reduced, and the manufacturing cost of the product can be suppressed.

BRIEF DESCRIPTION OF DRAWINGS

FIG. 11 is a schematic diagram showing an example of a conventional target speed table.

DESCRIPTION OF EMBODIMENTS

Figure 1:
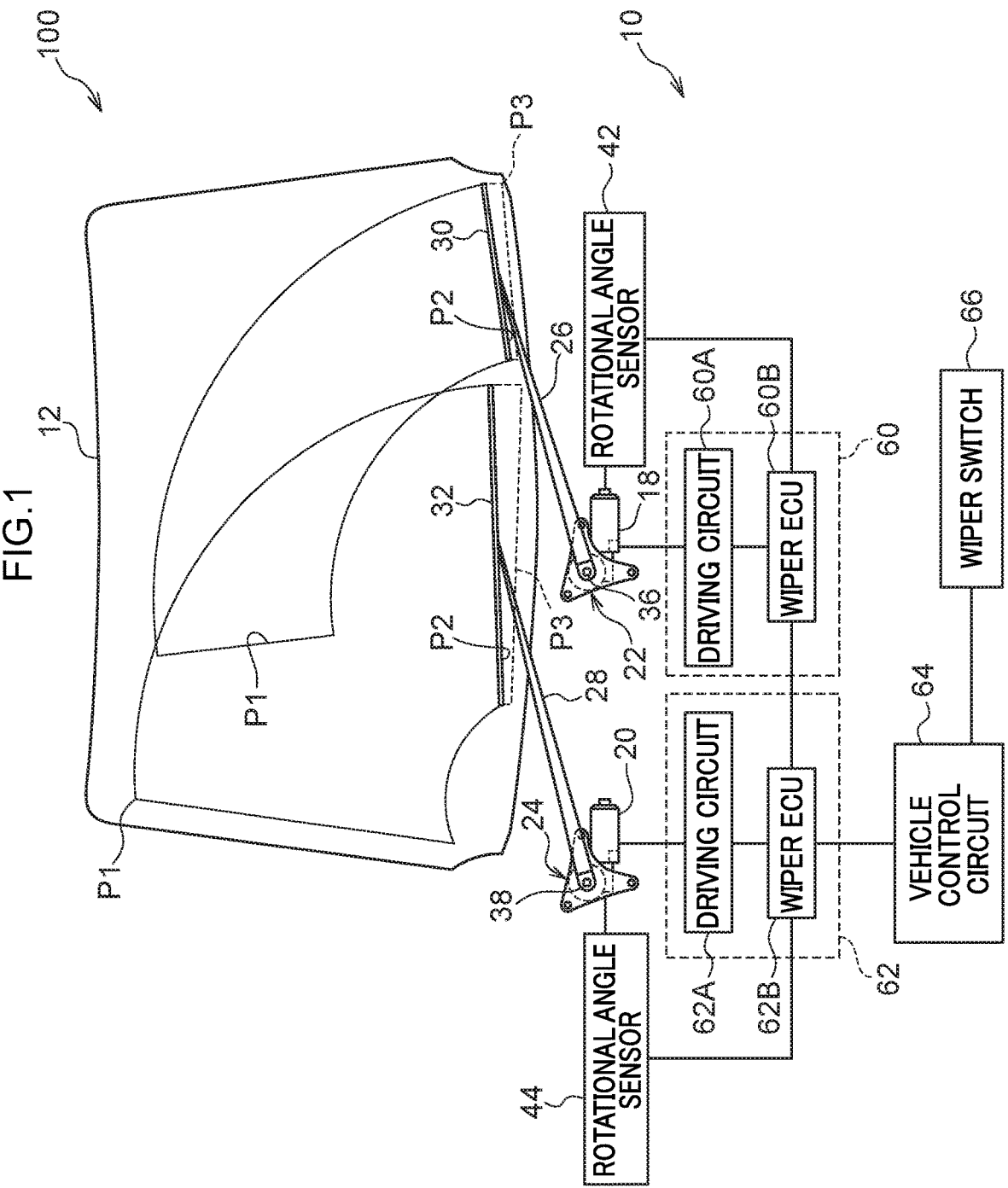
FIG. 1 is a schematic diagram showing a configuration of a wiper apparatus including a wiper control device according to the present embodiment.

FIG. 1 is a schematic diagram showing a configuration of a wiper apparatus 100 including a wiper control device 10 according to the present embodiment. As an example, the wiper apparatus 100 is a tandem type wiper apparatus including a left wiper apparatus 14 on the left (passenger's seat side) of a lower part of a windshield glass 12 of a vehicle, and a right wiper apparatus 16 on the right (driver's seat side) of a lower part of the windshield glass 12 of the vehicle. The left and the right on the present embodiment are the left and the right as seen from the vehicle interior.

The left wiper apparatus 14 and the right wiper apparatus 16 include wiper motors 18 and 20, deceleration mechanisms 22 and 24, wiper arms 26 and 28, and wiper blades 30 and 32, respectively. The wiper motors 18 and 20 are provided on the lower left side and the lower right side of the windshield glass 12, respectively.

In the left wiper apparatus 14 and the right wiper apparatus 16, the forward and reverse rotations of the wiper motors 18 and 20 are respectively decelerated by the deceleration mechanisms 22 and 24, and output shafts 36 and 38 are respectively rotated in the forward and reverse directions decelerated by the deceleration mechanisms 22 and 24. Further, when the rotating forces of the forward and reverse rotation of the output shafts 36 and 38 act on the wiper arms 26 and 28, the wiper arms 26 and 28 move from a storage position P3 to a lower reversal position P2, and reciprocates between the lower reversal position P2 and an upper reversal position P1. Due to the operations of the wiper arms 26 and 28, the wiper blades 30 and 32 respectively provided at the tips of the wiper arms 26 and 28 wipe between the lower reversal position P2 and the upper reversal position P1 on the surface of the windshield glass 12. Note that the deceleration mechanisms 22 and 24 are provided with, for example, worm gears or the like, respectively decelerate the rotations of the wiper motors 18 and 20 to the rotational speeds suitable for wiping the surface of the windshield glass 12 by the wiper blades 30 and 32, and respectively rotate the output shafts 36 and 38 at the rotational speeds.

As described above, since the wiper motors 18 and 20 according to the present embodiment include the deceleration mechanisms 22 and 24 provided with the worm gears, respectively, the rotational speeds and the rotational angles of the output shafts 36 and 38 are not the same as the rotational speeds and the rotational angles of the main bodies of the wiper motors 18 and 20. However, in the present embodiment, since the wiper motors 18 and 20 and the deceleration mechanisms 22 and 24 are respectively integrally formed inseparably, the rotational speeds and the rotational angles of the output shafts 36 and 38 are herein- after regarded as the rotational speed and the rotational angle of each of the wiper motors 18 and 20.

Wiper control circuits 60 and 62 for controlling the rotations of the wiper motors 18 and 20 are respectively connected to the wiper motors 18 and 20. The wiper control circuit 60 according to the present embodiment includes a driving circuit 60A and a wiper ECU 60B, and the wiper control circuit 62 includes a driving circuit 62A and a wiper ECU 62B.

A rotational angle sensor 42 that detects the rotational speed and the rotational angle of the output shaft 36 of the wiper motor 18 is connected to the wiper ECU 60B. A rotational angle sensor 44 that detects the rotational speed and the rotational angle of the output shaft 38 of the wiper motor 20 is connected to the wiper ECU 62B. The wiper ECUs 60B and 62B calculate the positions of the wiper blades 30 and 32 on the windshield glass 12 based on signals from the rotational angle sensors 42 and 44, respectively. In addition, the wiper ECUs 60B and 62B control the driving circuits 60A and 62A, respectively, such that the rotational speeds of the output shafts 36 and 38 change according to the calculated positions. Note that the rotational angle sensors 42 and 44 are respectively provided in the deceleration mechanisms 22 and 24 of the wiper motors 18 and 20, and convert the magnetic fields (magnetic forces) of excitation coils or magnets rotating in conjunction with the output shafts 36 and 38 into current and detect the current.

The driving circuits 60A and 62A generate voltages (currents) for respectively operating the wiper motors 18 and 20 by pulse width modulation (PWM) control, and respectively supply the voltages (currents) to the wiper motors 18 and 20. The driving circuits 60A and 62A include a circuit using a metal oxide semiconductor field effect transistor (MOSFET) as a switching element. The driving circuit 60A outputs a voltage of a predetermined duty ratio under the control of the wiper ECU 60B, and the driving circuit 62A outputs a voltage of a predetermined duty ratio under the control of the wiper ECU 62B.

The wiper ECU 60B and the wiper ECU 62B synchronize the operations of the left wiper apparatus 14 and the right wiper apparatus 16 by cooperating by interworking using a protocol such as, for example, local interconnect network (LIN). In addition, a wiper switch 66 is connected to the wiper ECU 62B of the wiper control circuit 62 through a vehicle control circuit 64.

The wiper switch 66 is a switch for turning on or off power supplied from a battery of a vehicle to the wiper motors 18 and 20. The wiper switch 66 can switch the wiper blades 30 and 32 to a low speed operation (LO operation) mode selection position for operating at a low speed, a high speed operation (HI operation) mode selection position for operating at a high speed, an intermittent operation mode selection position for intermittently operating at a constant cycle, or a stop mode selection position. In addition, a command signal for rotating the wiper motors 18 and 20 according to the selection position of each mode is output to the wiper ECU 62B through the vehicle control circuit 64. In addition, the command signal input to the wiper ECU 62B is also input to the wiper ECU 60B by communication using the protocol such as the LIN.

When the signal output from the wiper switch 66 according to the selected position of each mode are input to the wiper ECUs 60B and 62B, the wiper ECUs 60B and 62B perform control corresponding to the output signal from the wiper switch 66. Specifically, the wiper ECUs 60B and 62B calculate the rotational speeds of the output shafts 36 and 38 based on the command signal from the wiper switch 66.

Further, the wiper ECUs 60B and 62B control the driving circuits 60A and 62A such that the output shafts 36 and 38 rotate at the calculated rotational speed.

Figure 2:
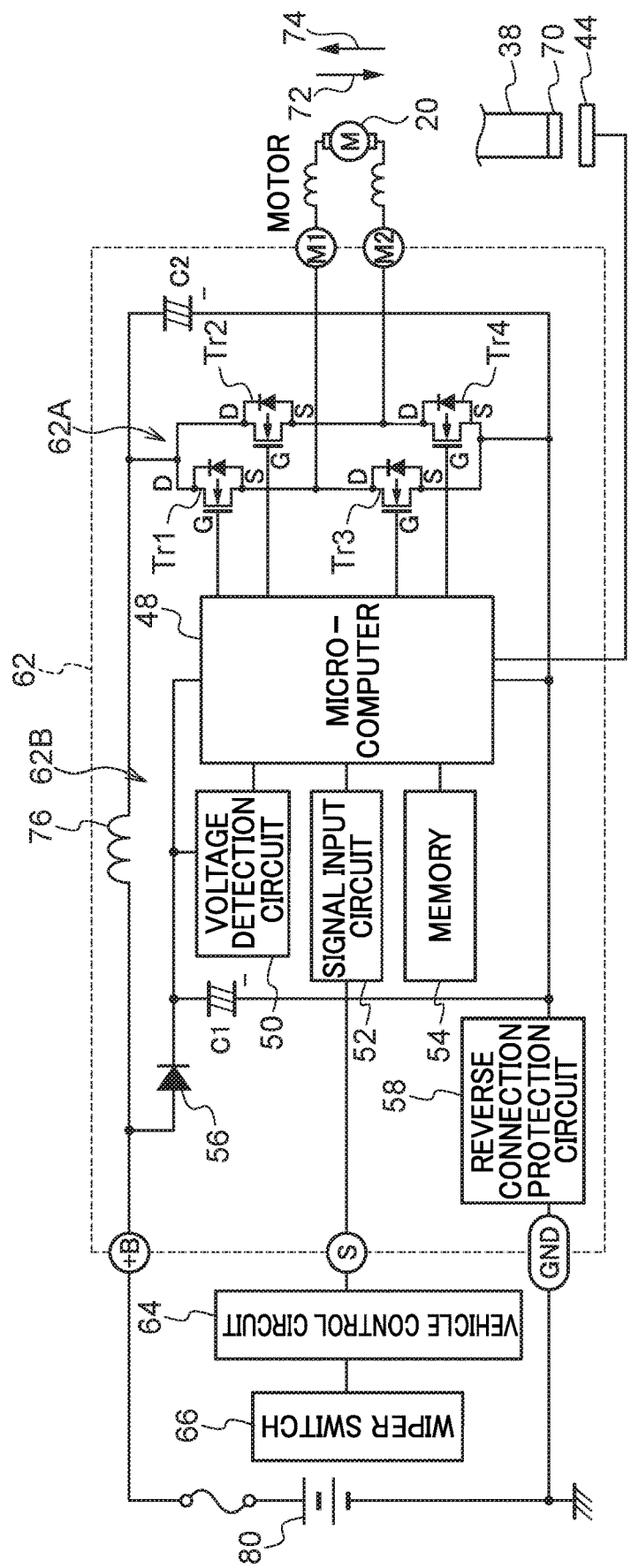
FIG. 2 is a block diagram showing an example of a schematic configuration of a wiper control circuit of a right wiper apparatus according to the present embodiment.

FIG. 2 is a block diagram showing an example of a schematic configuration of the wiper control circuit 62 of the right wiper apparatus 16 according to the present embodiment. In addition, as an example, the wiper motor 20 shown in FIG. 2 is a DC motor with a brush. Since the configuration of the wiper control circuit 60 of the left wiper apparatus 14 is the same as that of the wiper control circuit 62 of the right wiper apparatus 16, a detailed description thereof will be omitted.

The wiper control circuit 62 shown in FIG. 2 includes a driving circuit 62A that generates a voltage to be applied to a winding terminal of the wiper motor 20, and a microcomputer 48 of the wiper ECU 62B that controls on and off of a switching element constituting the driving circuit 62A. Power of a battery 80 is supplied to the microcomputer 48 through a diode 56. The voltage of the supplied power is detected by a voltage detection circuit 50 provided between the diode 56 and the microcomputer 48. The detection result is output to the microcomputer 48. In addition, an electrolytic capacitor C1 having one end connected between the diode 56 and the microcomputer 48 and the other end (−) grounded is provided. The electrolytic capacitor C1 is a capacitor for stabilizing the power supply of the microcomputer 48. The electrolytic capacitor C1 protects the microcomputer 48 by accumulating a sudden high voltage such as a surge and discharging the same to a ground region.

A command signal for instructing the rotational speed of the wiper motor 18 is input from the wiper switch 66 and the vehicle control circuit 64 to the microcomputer 48 through the signal input circuit 52. When the command signal output from the wiper switch 66 is an analog signal, the signal is converted to a digital signal in the signal input circuit 52 and the signal is input to the microcomputer 48.

In addition, the rotational angle sensor 44 for detecting the magnetic field of the sensor magnet 70 that changes according to the rotation of the output shaft 38 is connected to the microcomputer 48. The microcomputer 48 determines the positions of the wiper blades 30 and 32 on the windshield glass 12 by calculating the rotational angle of the output shaft 38 based on the signal output by the rotational angle sensor 44.

Further, the microcomputer 48 controls the driving circuit 62A such that the rotation of the wiper motor 20 has a rotational speed according to the specified positions of the wiper blade 30 and 32, with reference to the data of the rotational speed of the wiper motor 20 defined according to the positions of the wiper blades 30 and 32 stored in the memory 54.

As shown in FIG. 2, the driving circuit 62A uses transistors Tr1, Tr2, Tr3, and Tr4, which are N-type field effect transistors (FETs), as switching elements. Drains of the transistors Tr1 and Tr2 are connected to the battery 80 through a noise prevention coil 76, and sources thereof are connected to the drains of the transistors Tr3 and the transistor Tr4, respectively. In addition, sources of the transistors Tr3 and Tr4 are grounded.

The source of the transistor Tr1 and the drain of the transistor Tr3 are connected to one end of the winding of the wiper motor 18, and the source of the transistor Tr2 and the drain of the transistor Tr4 are connected to the other end of the winding of the wiper motor 18.

Since a high level signal is input to gates of the transistors Tr1 and Tr4, the transistor Tr1 and the transistor Tr4 are turned on, and for example, a CW current 72 for operating the wiper blades 30 and 32 in a clockwise direction when seen from the vehicle interior side flows through the wiper motor 20. Further, when one of the transistor Tr1 and the transistor Tr4 is on-controlled, the other is subjected to on/off control in small steps by PWM control, whereby the voltage of the CW current 72 can be modulated.

Since a high level signal is input to gates of the transistors Tr2 and Tr3, the transistor Tr2 and the transistor Tr3 are turned on, and for example, a CCW current 74 for operating the wiper blades 30 and 32 in a counterclockwise direction when seen from the vehicle interior side flows through the wiper motor 20. Further, when one of the transistor Tr2 and the transistor Tr3 is on-controlled, the other is subjected to on/off control in small steps by PWM control, whereby the voltage of the CCW current 74 can be modulated.

In the present embodiment, a reverse connection protection circuit 58 and a noise prevention coil 76 are provided between the battery 80, which is the power supply, and the driving circuit 62A, and an electrolytic capacitor C2 is provided in parallel with the driving circuit 62A. The noise prevention coil 76 is an element for suppressing noise generated by the switching of the driving circuit 62A.

The electrolytic capacitor C2 is an element for alleviating noise generated from the driving circuit 62A, storing a sudden high voltage such as a surge, and discharging the same to the ground region so as to prevent an excessive current from being input to the high voltage driving circuit 62A.

The reverse connection protection circuit 58 is a circuit for protecting elements constituting the wiper control circuit 62 when a positive electrode and a negative electrode of the battery 80 are connected in reverse to the case shown in FIG. 2. As an example, the reverse connection protection circuit 58 includes a so-called diode-connected FET or the like in which the drain thereof is connected to the gate thereof.

Figure 3:
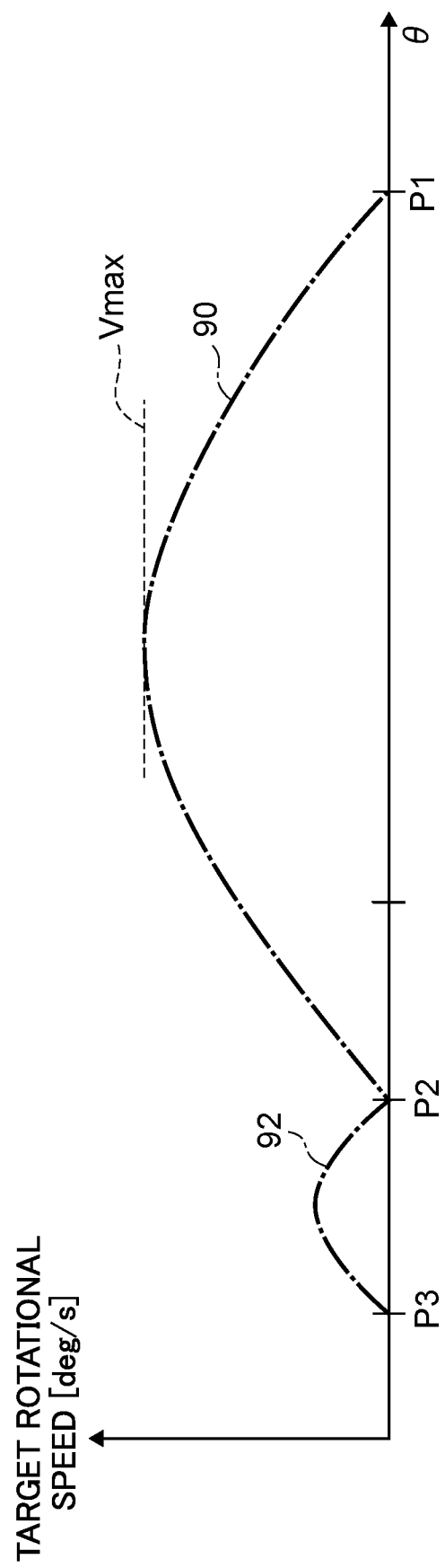
FIG. 3 is a schematic diagram showing an example of a target speed map in the wiper control device according to the present embodiment.

Hereinafter, the function and effect of the wiper control device 10 according to the present embodiment will be described. FIG. 3 shows an example of a target speed map in the wiper control device 10 according to the present embodiment. In FIG. 3, a horizontal axis of the target speed map is the rotational angles of the output shafts 36 and 38 of the wiper motors 18 and 20, and a vertical axis is the rotational speeds of the output shafts 36 and 38 of the wiper motors 18 and 20. In the present embodiment, the rotational angles of the output shafts 36 and 38 is detected by the rotational angle sensors 42 and 44.

As shown in FIG. 3, the wiper control device 10 according to the present embodiment stores, in the memory 54, the upper/lower reversal position target speed table 90 in which the target rotational speeds of the output shafts 36 and 38 are determined in association with the change in the rotational angles of the output shafts 36 and 38 when the wiper blades 30 and 32 are moved between the upper reversal position P1 and the lower reversal position P2. In addition, the wiper control device 10 according to the present embodiment stores, in the memory 54, the storage position/lower reversal position target speed table 92 that determines the target rotational speeds of the output shafts 36 and 38 in association with the change in the rotational angles of the output shafts 36 and 38 when the wiper blades 30 and 32 are moved between the storage position P3 and the lower reversal position P2. The upper/lower reversal position target speed table 90 and the storage position/lower reversal position target speed table 92 determines the rotational speeds of the output shafts 36 and 38 in association with the change in the rotational angles of the output shafts 36 and 38 when the wiper blades 30 and 32 are moved between one predetermined position and the other predetermined position.

The upper/lower reversal position target speed table 90 accelerates the target rotational speeds of the wiper motors 18 and 20 from 0 when the wiper blades 30 and 32 start moving from the lower reversal position P2, and decelerates after the target rotational speed reaches the maximum value $V_{max}$, such that the target rotational speed is determined to become 0 when the wiper blades 30 and 32 reach the upper reversal position P1.

The storage position/lower reversal position target speed table 92 accelerates the target rotational speeds of the wiper motors 18 and 20 from 0 when the wiper blades 30 and 32 start moving from the storage position P3, and decelerates after the target rotational speed reaches the maximum value, such that the target rotational speed is determined to become 0 when the wiper blades 30 and 32 reach the lower reversal position P2.

The upper/lower reversal position target speed table 90 and the storage position/lower reversal position target speed table 92 each include an upper convex smooth curve and determines the target rotational speed to monotonically increase from 0 to the maximum value and monotonically decrease from the maximum value to 0.

As will be described later, in the present embodiment, the upper/lower reversal position target speed table 90 and the storage position/lower reversal position target speed table 92 are corrected according to the positions at which the wiper blades 30 and 32 start to reverse or move, and the target rotational speeds of the wiper motors are calculated based on the corrected upper/lower reversal position target speed table 90 and the corrected storage position/lower reversal position target speed table 92. In the present embodiment, as an example, the positions of the wiper blades 30 and 32 are indicated by the rotational angles of the output shafts 36 and 38 detected by the rotational angle sensors 42 and 44.

For example, as will be described later with reference to FIG. 10, in a case in which the wiper blades 30 and 32 start the wiping operation from the storage position P3 and move to the upper reversal position P1, the upper/lower reversal position target speed table 90 is corrected according to the storage position P3 and the upper reversal position P1 and applied to the control of the rotational speeds of the output shafts 36 and 38. Therefore, in the present embodiment, the target speed table that defines the target rotational speed from the storage position P3 to the upper reversal position P1 is not required.

In addition, in a case in which the wiper blades 30 and 32 are moved to the storage position P3 after the wiper blades 30 and 32 overrun in the direction from the lower reversal position P2 to the storage position P3 and stop, the storage position/lower reversal position target speed table 92 is corrected according to the positions of the wiper blades 30 and 32 after the overrunning and the storage position P3 and is applied to the control of the rotational speeds of the output shafts 36 and 38.

Similarly, in a case in which the wiper blades are moved to the storage position P3 after the wiper blades 30 and 32 are stopped before the lower reversal position P2, the storage position/lower reversal position target speed table 92 is corrected according to the positions of the wiper blades 30 and 32 before the lower reversal position P2 and the storage position P3 and is applied to the control of the rotational speeds of the output shafts 36 and 38.

Figure 4:
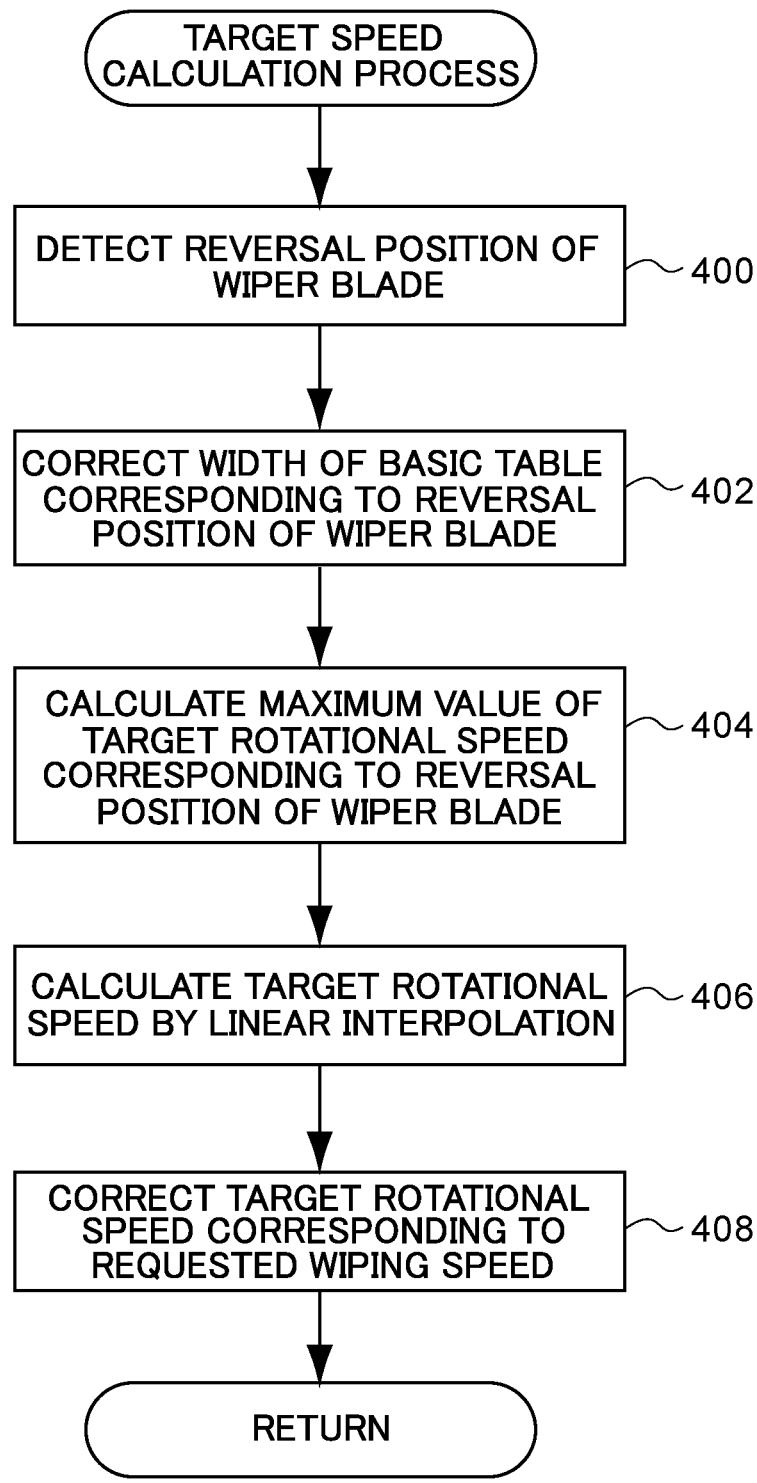
FIG. 4 is a flowchart showing an example of a target speed calculation process of the wiper control device according to the present embodiment.

Therefore, in each of the target speed tables shown in FIG. 3, unlike the target speed table shown in FIG. 11, the target rotational speed is set to 0 at each of the storage position P3, the lower reversal position P2, and the upper reversal position P1. In the present embodiment, in the case shown in FIG. 11, it is easy to set the target speed table because it is unnecessary to set the target speed table in anticipation of the overrun of the wiper blades 30 and 32, FIG. 4 is a flowchart showing an example of a target speed calculation process of the wiper control device 10 according to the present embodiment. In step 400, the reversal positions of the wiper blades 30 and 32 are detected from the rotational angles of the output shafts of the wiper motors 18 and 20 detected by the rotational angle sensors 42 and 44. The wiper blades 30 and 32 are not always reversed at the upper reversal position P1 and the lower reversal position P2. For example, in a case in which an obstacle such as a lump of snow exists on the windshield glass 12, the wiper blades 30 and 32 stop the wiping operation from the upper reversal position P1 before arriving the lower reversal position P2 and start reversing or operating from the position at which the operation is stopped.

Figure 5:
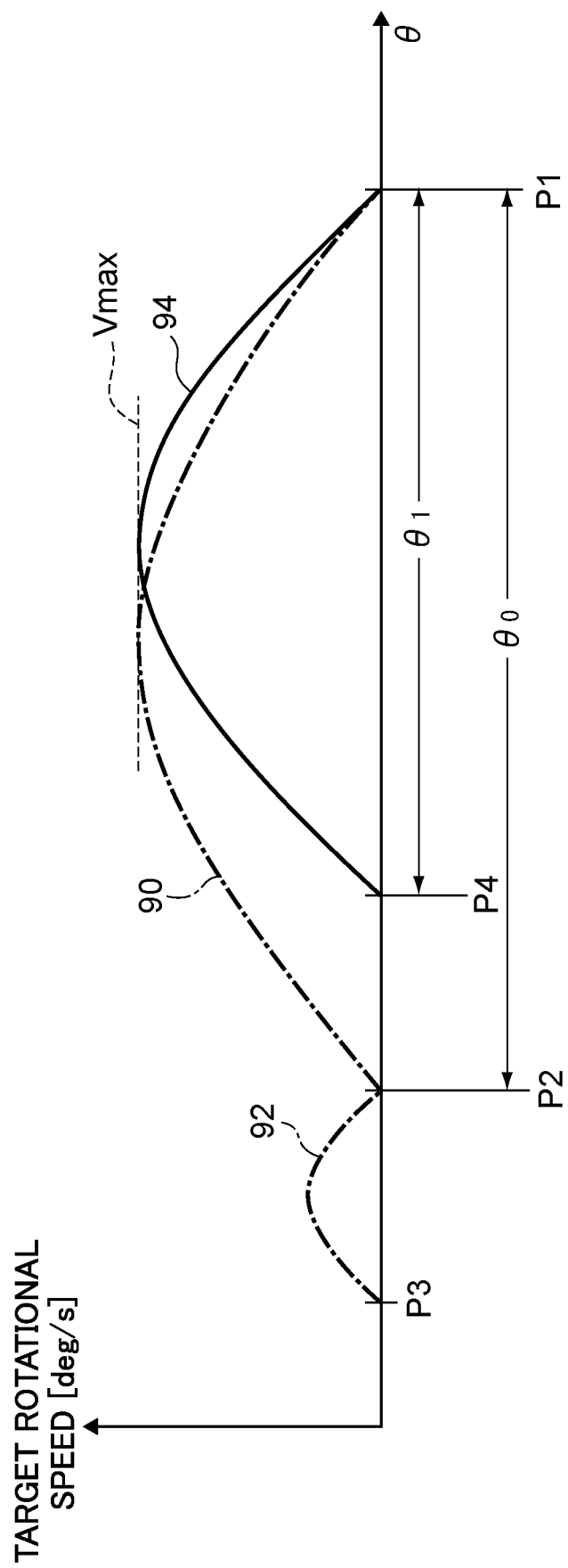
FIG. 5 shows a case in which a first correction target speed table is calculated by correcting a width of a basic table when a wiper blade reverses before a lower reversal position due to the influence of an obstacle on a windshield glass, or the like in the present embodiment.

In step 402, the width of the basic table according to the reversal positions of the wiper blades 30 and 32 is corrected. FIG. 5 shows a case in which in a case in which the wiper blades 30 and 32 are reversed at the reversal position P4 before the lower reversal position P2 due to the influence of an obstacle on the windshield glass 12 or the like, a first correction target speed table 94 is calculated by correcting the width of the upper/lower reversal position target speed table 90 that is the basic table.

In the correction of the width of the basic table, for example, a correction ratio $K_1$ that is a quotient of a change amount $\theta_1$ of the rotational angles of the output shafts 36 and 38 between the reversal position P4 and the upper reversal position P1 and a change amount $\theta_0$ of the rotational angles of the output shafts 36 and 38 between the lower reversal position P2 and the upper reversal position P1 is calculated in the following Formula (1). The first correction target speed table 94 is calculated by expanding and contracting the upper/lower reversal position target speed table 90 in the horizontal axis direction based on the calculated correction ratio $K_1$, and the first correction target speed table 94 is applied between the reversal position P4 and the upper reversal position P1.

$$K_1 = \theta_1 / \theta_0 \quad (1)$$

As will be described later, each of the upper/lower reversal position target speed table 90 and the storage position/lower reversal position target speed table 92 is set such that the target rotational speed is not a continuous value but a finite number of discrete values. In the expansion and contraction process of step 402, various methods are considered, but if the upper/lower reversal position target speed table 90 and the storage position/lower reversal position target speed table 92 are a set of a finite number of discrete values, the expansion and contraction process on the horizontal axis of the upper/lower reversal position target speed table 90 and the storage position/lower reversal position target speed table 92 is performed by multiplying the interval (angle) on the horizontal axis of the adjacent value by the correction ratio $K_1$ described above.

In FIG. 5, the first correction target speed table 94 is generated by applying the upper/lower reversal position target speed table 90, on which the expansion and contraction process is performed on the horizontal axis, between the reversal position P4 and the upper reversal position P1. More specifically, the first correction target speed table 94 is calculated by plotting each value of the upper/lower reversal position target speed table 90, on which the expansion and contraction process is performed on the horizontal axis, from the reversal position P4 to the upper reversal position P1.

Figure 6:
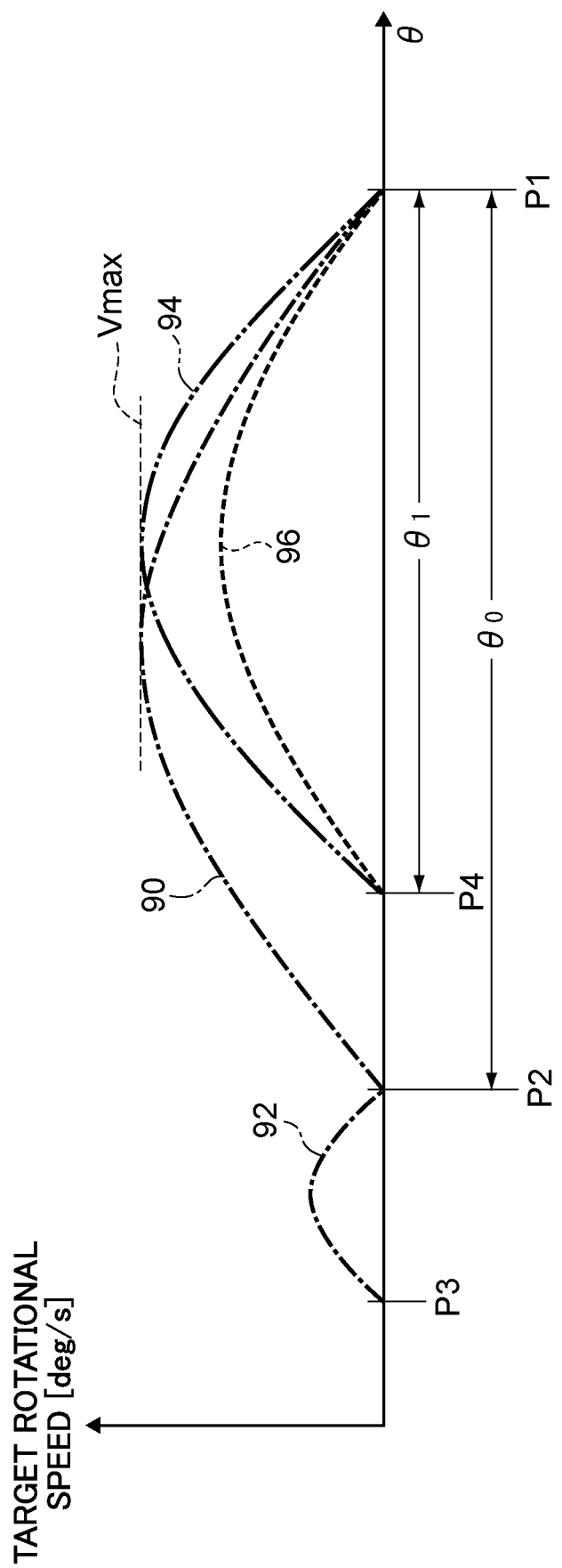
FIG. 6 shows an example of a second correction target speed table obtained by correcting the maximum value of the first correction target speed table according to the reversal position in the present embodiment.

In step 404, the maximum value of the target rotational speed according to the reversal position P4 is calculated. FIG. 6 shows an example of a second correction target speed table 96 obtained by correcting the maximum value of the first correction target speed table 94 according to the reversal position P4 in the present embodiment. In step 404, a second correction target speed table 96 in which each value including the maximum value is corrected according to the reversal position P4 is calculated by multiplying the correction ratio $K_1$ by each value of the target rotational speeds including the maximum value of the first correction target speed table 94.

Figure 7:
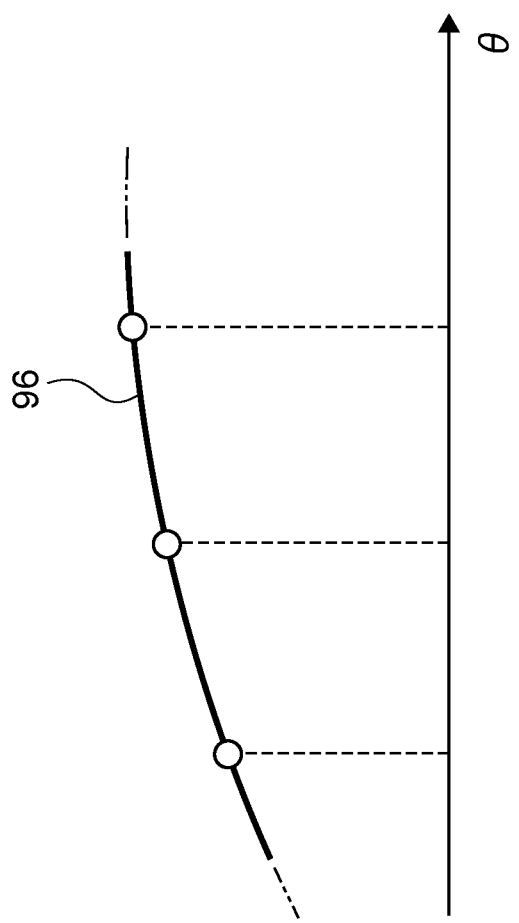
FIG. 7 is a schematic diagram showing an example of linear interpolation in the present embodiment.

In step 406, linear interpolation is performed between the respective values of the target rotational speed of the second correction target speed table 96. FIG. 7 is a schematic diagram showing an example of linear interpolation. In the present embodiment, the upper/lower reversal position target speed table 90, which is the basic table, holds the target rotational speed as a discrete value instead of a continuous value. Since the second correction target speed table 96 is based on the upper/lower reversal position target speed table 90 that is the basic table as described above, the target rotational speed is held as a finite number of discrete values, just like the second correction target speed table 96. The number of the finite number of values held by each of the upper/lower reversal position target speed table 90 and the second correction target speed table 96 is, for example, about 20 to about 100, but a specific number is determined according to the specification of the wiper apparatus 100 and the like.

When the rotations of the wiper motors 18 and 20 is controlled according to the table in which the target rotational speed is discretely determined, there is a possibility that the rotations of the wiper motors 18 and 20 will become irregular when switching from the control according to one of target rotational speeds to the control according to the other of target rotational speeds. Therefore, in the present embodiment, interpolation is performed between the respective values of the target speeds discretely determined by the second correction target speed table 96 by the linear interpolation shown in FIG. 7.

In step 408, the target rotational speed according to the requested wiping speed is corrected. In many cases, in the wiper apparatus for the vehicle, the wiping speed of the wiper blade is switched between the high speed HI operation and the low speed LO operation. Further, the wiping speed of the wiper blade may be arbitrarily settable between the wiping speed at the time of the LO operation and the wiping speed at the time of the HI operation.

Figure 8:
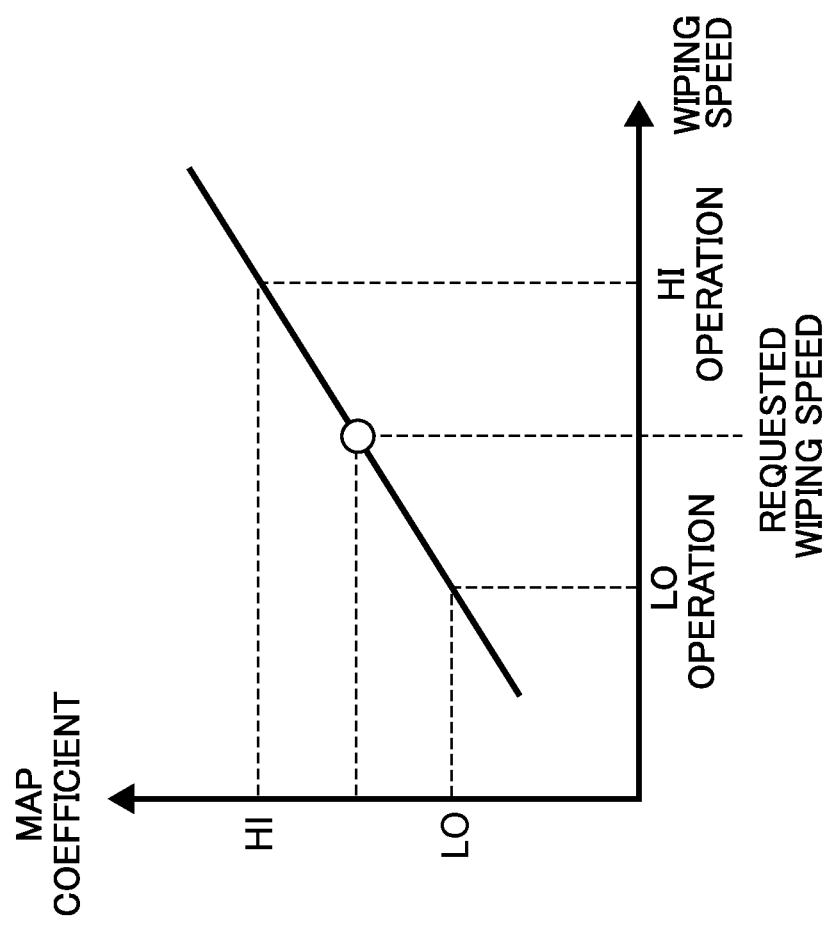
FIG. 8 is a graph showing an example of correspondence between a requested wiping speed and a map coefficient in the present embodiment, in which an arbitrary wiping speed between a wiping speed at the time of an LO operation and a wiping speed at the time of an HI operation is designated as a requested wiping speed.

FIG. 8 is a graph showing an example of correspondence between a requested wiping speed and a map coefficient, in which an arbitrary wiping speed between a wiping speed at the time of an LO operation and a wiping speed at the time of an HI operation is designated as a requested wiping speed. In step 408, each value in the second correction target speed table 96 is multiplied by a map coefficient according to a designated requested wiping speed, thereby calculating a third correction target speed table 98 according to a requested wiping speed.

Figure 9:
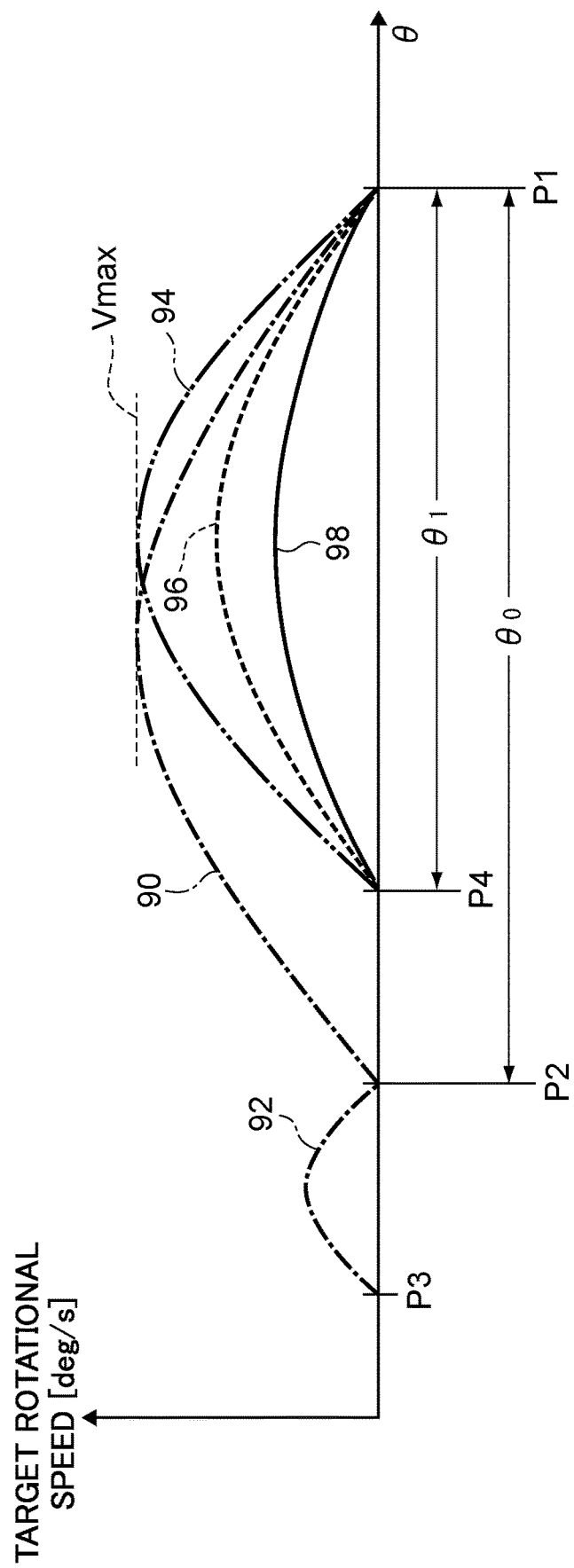
FIG. 9 is a schematic diagram showing an example of a third correction target speed table according to the present embodiment.

FIG. 9 is a schematic diagram showing an example of a third correction target speed table 98. As shown in FIG. 9, the target rotational speed indicated by the third correction target speed table 98 is lower than the target rotational speed indicated by the second correction target speed table 96. FIG. 9 shows a case in which each value of the second correction target speed table 96 is multiplied by a map coefficient of from 0 to 1. In order to make the wiping speeds of the wiper blades 30 and 32 faster than in the case of the second correction target speed table 96, each value of the second correction target speed table 96 is multiplied by a map coefficient of 1 or more than 1.

The case in which the third correction target speed table 98 according to the reversal position P4 and the requested wiping speed is calculated from the upper/lower reversal position target speed table 90 has been described with reference to FIGS. 3 to 9. In the present embodiment, the wiper motors 18 and 20 are controlled such that the rotational speed corresponds to the reversal position by correcting the upper/lower reversal position target speed table 90, which is the basic table, according to the reversal position. Therefore, in a case in which the wiper blades 30 and 32 start to reverse or move from the position different from the lower reversal position P2 or the upper reversal position P1, It is possible to prevent the rotational speeds of the output shafts 36 and 38 of the wiper motors 18 and 20 from suddenly changing and to smoothly control the rotational speeds of the wiper motors 18 and 20. As a result, the wiping speeds of the wiper blades 30 and 32 can be smoothly changed.

In addition, in the present embodiment, it is unnecessary to previously store the target speed table determined according to the requested wiping speed by further correcting the target speed table, which has been corrected according to the reversal position, according to the requested wiping speed. The target speed table to be stored in the memory 54 is the upper/lower reversal position target speed table 90, which is the basic table. In the case of a concealed type wiper apparatus, the storage position/lower reversal position target speed table 92 that defines the target rotational speeds of the wiper motors 18 and 20 between the storage position P3 and the lower reversal position P2 may be stored in the memory 54.

Therefore, the target speed tables previously stored in the memory 54 are the upper/lower reversal position target speed table 90 and the storage position/lower reversal position target speed table 92. As a result, the capacity of the storage device of the wiper apparatus can be suppressed as compared with the case of storing a plurality of tables according to the requested wiping speed, and the production cost of the product can be reduced.

As described above, the case in which the wiper blades 30 and 32 start operations by reversing or the like at the position before arriving the lower reversal position P2 (before arriving the upper reversal position P1) has been described. In the present embodiment, in a case in which the wiper blades 30 and 32 start operations by reversing or the like between the lower reversal position P2 and the storage position P3, the rotational speeds of the wiper motors 18 and 20 are smoothly controlled by correcting the upper/lower reversal position target speed table 90 that is the basic table.

Figure 10:
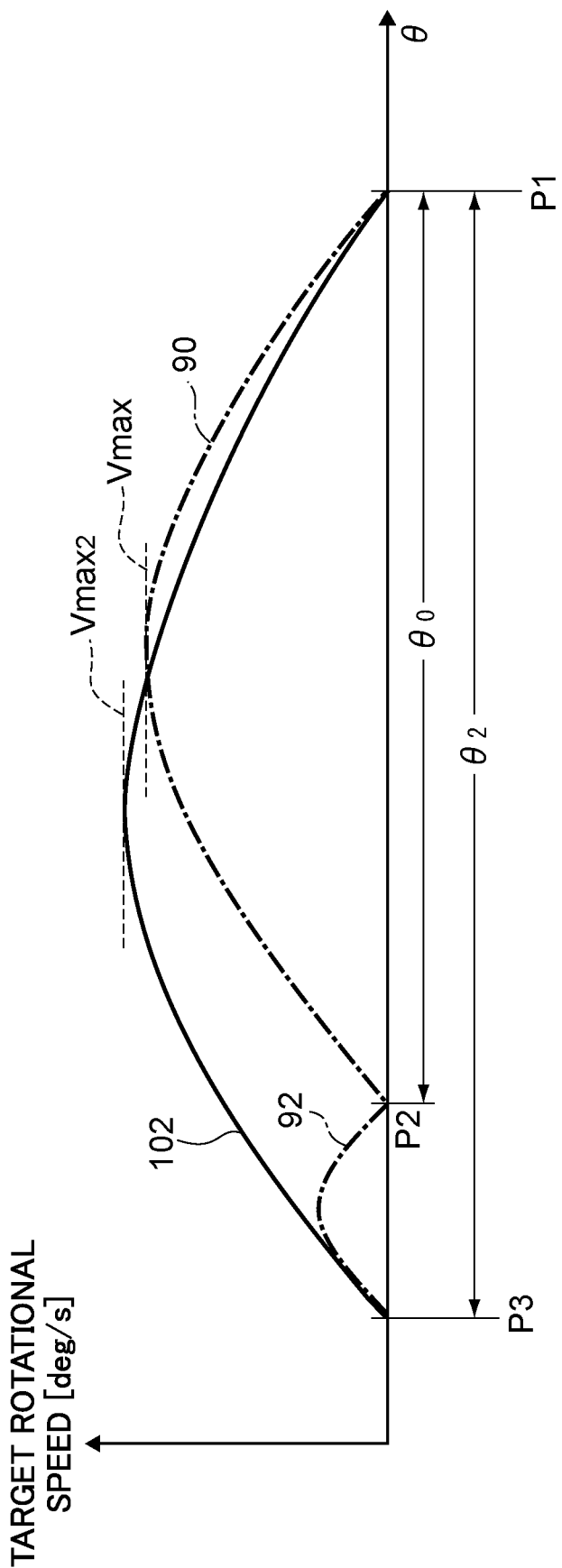
FIG. 10 is a schematic diagram showing an example of a fourth correction target speed table used when the wiper blade starts operating from a storage position in the present embodiment.

FIG. 10 is a schematic diagram showing an example of a fourth correction target speed table 102 in a case in which the wiper blades 30 and 32 start operating from the storage position P3. A calculation procedure of a fourth correction target speed table 102 is also the same as in the case of the third correction target speed table 98. That is, the width of the upper/lower reversal position target speed table 90 is corrected according to the storage position P3 by using a correction ratio $K_2$ calculated by the following Formula (2).

$$K_2 = \theta_2/\theta_0 \qquad (2)$$

The fourth correction target speed table 102 in which the maximum value $V_{max}$ is corrected to $V_{max2}$ according to the storage position P3, is calculated by multiplying the correction ratio $K_2$ by each value including the maximum value of the target rotational speed of the target speed table corrected according to the storage position P3. The calculated fourth correction target speed table 102 is applied to not only the case of moving the wiper blades 30 and 32 from the storage position P3 to the upper reversal position P1 but also the case of moving the wiper blades 30 and 32 from the upper reversal position P1 to the storage position P3.

Further, in the case of changing the requested wiping speed, the target speed table required for the rotational speeds of the wiper motors 18 and 20 is calculated by multiplying each value of the fourth correction target speed table 102 by the map coefficient according to the requested wiping speed.

As described above, in the present embodiment, the wiper motors 18 and 20 are controlled so as to have the rotational speed according to the reversal position or the position at which the operation is started by correcting the basic table according to the reversal position or the position at which the wiper blade starts operating. Therefore, in a case in which the wiper blades 30 and 32 start to reverse or move from the position different from the lower reversal position P2 or the upper reversal position P1, it is possible to prevent the rotational speeds of the output shafts 36 and 38 of the wiper motors 18 and 20 from suddenly changing and to smoothly control the rotational speeds of the wiper motors 18 and 20. As a result, the wiping speeds of the wiper blades 30 and 32 can be smoothly changed.

Note that the wiper control device 10 according to the present embodiment may also be used for a wiper apparatus having a link mechanism other than the tandem type wiper apparatus 100 having no link mechanism.

In addition, the invention is not limited to the above, and it is needless to say that various modifications other than the above can be made within the range without departing from the spirit.

The disclosure of Japanese Patent Application No. 2016-017134, filed on Feb. 1, 2016, is incorporated herein by reference in its entirety.

The invention claimed is:

1. A wiper control device, comprising:
a storage unit that stores previously-determined rotational speed information defining a target rotational speed of a wiper motor in a case in which a wiper blade is moved between a first predetermined position and a second predetermined position; and
a control unit that, in a case in which the wiper blade starts operating from an operation start position that is different from both of the first predetermined position and the second predetermined position, with one of the first predetermined position or the second predetermined position as a next movement destination, controls a rotational speed of the wiper motor by using corrected rotational speed information obtained by applying a coefficient to the previously-determined rotational speed information stored in the storage unit, the coefficient being based on the operation start position and a position of the next movement destination of the wiper blade,
wherein the corrected rotational speed information is not stored in the storage unit.

2. The wiper control device according to claim 1, further comprising a rotational angle detection unit that detects a rotational angle of an output shaft of the wiper motor, wherein:
the target rotational speed of the previously-determined rotational speed information is determined according to the rotational angle of the output shaft, and
the control unit obtains the corrected rotational speed information by correcting the target rotational speed using a correction ratio that is a ratio of (i) a rotational angle range between the operation start position and the next movement destination to (ii) a rotational angle range between the first predetermined position and the second predetermined position.

3. The wiper control device according to claim 2, wherein the control unit corrects a rotational angle range of the previously-determined rotational speed information by multiplying the rotational angle range between the first predetermined position and the second predetermined position of the previously-determined rotational speed information by the correction ratio, and controls the rotational speed of the wiper motor by applying, between the operation start position and the next movement destination, the corrected rotational speed information, which is obtained by multiplying, by the correction ratio, the target rotational speed of the previously-determined rotational speed information obtained by correcting the rotational angle range.

4. The wiper control device according to claim 1, wherein, in a case in which a signal for changing a moving speed of the wiper blade is input, the control unit controls the rotational speed of the wiper motor based on the previously-determined rotational speed information, which is further corrected by multiplying the target rotational speed of the corrected rotational speed information by a coefficient based on a signal for changing the moving speed.

5. The wiper control device according to claim 1, wherein:
the target rotational speed of the previously-determined rotational speed information is discretely determined with respect to a discrete value of the rotational angle of the output shaft of the wiper motor, and
the control unit calculates a rotational speed between respective values of the discretely determined target rotational speed of the previously-determined rotational speed information by linear interpolation.

6. A wiper control device comprising:
a storage unit that stores rotational speed information defining a target rotational speed of a wiper motor in a case in which a wiper blade is moved between a first predetermined position and a second predetermined position;
a control unit that, in a case in which the wiper blade starts operating from an operation start position that is different from both of the first predetermined position and the second predetermined position, with one of the first predetermined position or the second predetermined position as a next movement destination, controls a rotational speed of the wiper motor by using corrected rotational speed information obtained by correcting the rotational speed information based on the operation start position and a position of the next movement destination of the wiper blade; and
a rotational angle detection unit that detects a rotational angle of an output shaft of the wiper motor, wherein:
the target rotational speed of the rotational speed information is determined according to the rotational angle of the output shaft, and the control unit obtains the corrected rotational speed information by correcting the target rotational speed using a correction ratio that is a ratio of (i) a rotational angle range between the operation start position and the next movement destination to (ii) a rotational angle range between the first predetermined position and the second predetermined position.

7. The wiper control device according to claim 6, wherein the control unit corrects a rotational angle range of the rotational speed information by multiplying the rotational angle range between the first predetermined position and the second predetermined position of the rotational speed information by the correction ratio, and controls the rotational speed of the wiper motor by applying, between the operation start position and the next movement destination, the corrected rotational speed information, which is obtained by multiplying, by the correction ratio, the target rotational speed of the rotational speed information obtained by correcting the rotational angle range.

* * * * *